(12) United States Patent
Philipp et al.

(10) Patent No.: US 9,096,007 B2
(45) Date of Patent: Aug. 4, 2015

(54) BLOW MOULDING MACHINE

(71) Applicant: KRONES AG, Neutraubling (DE)

(72) Inventors: Thomas Philipp, Sinzing-Eilsbrunn (DE); Thomas Spitzer, Wiesent (DE); Florian Geltinger, Donaustauf (DE); Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/098,004

(22) Filed: Dec. 5, 2013

(65) Prior Publication Data

US 2014/0151940 A1    Jun. 5, 2014

(30) Foreign Application Priority Data

Dec. 5, 2012   (DE) .................... 10 2012 023 703

(51) Int. Cl.
| | | |
|---|---|---|
| *B29C 49/56* | (2006.01) | |
| *B29C 49/06* | (2006.01) | |
| *B29C 49/36* | (2006.01) | |

(52) U.S. Cl.
CPC .............. *B29C 49/56* (2013.01); *B29C 49/06* (2013.01); *B29C 49/36* (2013.01); *B29C 2049/566* (2013.01)

(58) Field of Classification Search
CPC ............................................... B29C 2049/566
USPC .......... 425/451.4, 540, 541, DIG. 5; 264/523, 264/538, 543; 65/360
See application file for complete search history.

(56) References Cited

U.S. PATENT DOCUMENTS

| | | | | |
|---|---|---|---|---|
| 656,505 | A * | 8/1900 | Brannagan ................... | 65/156 |
| 1,137,000 | A * | 4/1915 | Brookfield et al. ............ | 65/248 |
| 3,624,672 | A * | 11/1971 | Spivy ............................ | 425/156 |
| 3,825,396 | A * | 7/1974 | Kontz ........................... | 425/541 |
| 7,341,443 | B2 * | 3/2008 | Lemaistre et al. ............ | 425/540 |
| 2006/0275525 | A1 | 12/2006 | Lemaistre et al. | |
| 2007/0190202 | A1 | 8/2007 | Mie et al. | |
| 2011/0064840 | A1 | 3/2011 | Bergatti et al. | |
| 2011/0236525 | A1 | 9/2011 | Spitzer | |
| 2012/0225158 | A1 | 9/2012 | Voth et al. | |
| 2012/0286455 | A1 | 11/2012 | Weiss | |

FOREIGN PATENT DOCUMENTS

| | | |
|---|---|---|
| DE | 102008010885 | 8/2009 |
| EP | 1535719 | 6/2005 |

* cited by examiner

*Primary Examiner* — Robert B Davis
(74) *Attorney, Agent, or Firm* — Greer, Burns & Crain, Ltd.

(57) ABSTRACT

An apparatus is provided for the shaping of plastics material containers, with a movable carrier on which are arranged a plurality of shaping stations for the shaping of plastics material pre-forms into plastics material containers, wherein these shaping stations have blow mold carrier parts movable with respect to each other for opening and closing the shaping stations, and wherein the shaping stations have a locking mechanism for holding the shaping stations in a closed state.

23 Claims, 8 Drawing Sheets

BLOW MOULDING MACHINE

BACKGROUND

The present invention relates to an apparatus for the shaping of plastics material or glass pre-forms into plastics material containers. Machines of this type are known from the prior art. Usually machines of this type have a rotatable carrier on which are arranged a plurality of blow moulding stations. In this case these blow moulding stations or shaping stations have moulded parts in each case which can be closed in order to form a cavity in this way inside which the plastics material or glass pre-forms are expanded to form the plastics material containers, in particular by being acted upon with compressed air. In this case it is usual for guide cams which close the two mould parts with each other to be provided. In addition, locking mechanisms (in part with separate guide cams) which lock the blow mould in a closed state are known from the prior art, which is helpful since very high pressures occur in the interior of the blow mould. As a result of the use of a locking means, the cam which is responsible for the opening and closing can be kept short (in the region where the mould carrier for the removal of the bottle and for the insertion of a pre-form is situated), since the locking automatically keeps the halves of the mould carrier closed for the remainder of the revolution of the blow moulding wheel. The blow moulding machines in which the locking means is actuated by a separate mechanism usually have two locking cam segments which are separate from each other. One (locking cam segment) is situated in the region just in front of the cam for opening the blow mould parts, as viewed in the running direction of the blow moulding wheel. One is situated in the region just after the cam for closing the blow mould parts. No cam which co-operates with the locking means is provided between them. The cam follower (usually a steel roller) mounted on the locking means must therefore be accelerated twice by a cam per revolution of the blow moulding wheel. In addition, the cam followers are subjected to directions of rotation which change in part or respectively it is necessary for two cam rollers to be provided per locking means in order to avoid a change in the direction of rotation. The cam segments of the locking means are designed to be capable of being deflected in part for reasons of safety, if locking cannot be carried out on account of jamming, the cam has to swing out on account of excessive loading in order to prevent damage to the locking means.

These procedures have proved as being effective, but are in part relatively complicated technically or are disadvantageous in terms of wear.

SUMMARY

The object of the present invention is therefore to make available an apparatus for the shaping of plastics material or glass pre-forms into plastics material or glass containers, which is designed in a technically simpler and preferably also more inexpensive and more reliable manner and subject to less wear as compared with apparatus according to the prior art.

An apparatus according to the invention for the shaping of plastics material pre-forms into plastics material containers has a rotating carrier on which are arranged a plurality of shaping stations for the shaping of plastics material pre-forms into plastics material containers. In this case these shaping stations each have blow mould carrier parts movable with respect to each other in each case for opening and closing the shaping stations, and the shaping stations have a locking mechanism in order to hold the shaping stations in a closed state. In addition, an opening and closing mechanism is present in order to open and close the shaping stations.

According to the invention the locking mechanism has a locking cam opposite which the shaping stations move at least in part, this locking cam extending—as viewed in the direction of movement of the carrier—continuously between a position in which the blow mould carrier parts are opened (in particular from the beginning of the opening procedure) and a position in which the blow mould carrier parts are closed (in particular as far as at least the position in which locking of the locking means in a positive manner can be achieved, and in particular as far as the end of the closing procedure), and the blow mould carrier parts are held automatically in the closed state at least along a further partial section of the periphery by a locking means arranged on the blow mould carrier parts.

The further partial section is, in particular, the one in which the stretching and/or the expansion of the pre-form with compressed air takes place. This partial section can be situated for example in a range of from 120° to 240° of the periphery of the blow moulding wheel.

The starting position of the locking cam during the opening can alternatively also be indicated in such a way that it involves the position in which a locking of the locking means in a positive or non-positive manner is discontinued so that the blow mould carrier parts can be opened. The same applies to the end position of the locking cam: in this case a locking in a positive or non-positive manner is achieved again during or after a closing of the blow mould carrier parts. In particular, a container is brought out between the two positions in normal operation and a new pre-form is introduced.

The word "automatic" means that the locking mechanism operates in such a way that a locking element is hooked in for example by a locking cam and this locked state is maintained during the blow moulding procedure, namely without a locking cam acting further upon the locking means. In other words, the shaping station in the partial section itself ensures that it remains locked by retaining the locked state exclusively by elements arranged on it—the region of the partial section is free of the locking cam as it were.

0° as a point of reference refers in this specification to the point along the periphery of a blow moulding wheel (rotating carrier) which is situated precisely in the middle between an apparatus for removing the containers from the shaping station (in particular a discharge star wheel which removes finished blow moulded containers from the shaping stations) and an apparatus for introducing pre-forms into the shaping stations (in particular an insertion star wheel which introduces pre-forms into the shaping stations). It is usual for 0° also to be approximately at the maximum opening position of the mould carriers. If the pre-forms and the containers are introduced and removed by the same apparatus, then the middle of this apparatus is 0°. Since the invention is also capable of being applied in the case of blow moulding machines which do not rotate in a circle, 0° in these machines should be situated as the position between the beginning of an opening and the end of a closing of the shaping stations. For conversion, 180° would then correspond to half the path of a revolution covered.

The position in which the blow mould parts are unlocked is usually between approximately 270° to approximately 355°, they are opened from approximately 0.1° to 10° later (start of the opening movement), and the removal of the containers is carried out between 2° and 50° after the start of the opening movement. The position in which the mould carrier halves are eventually closed is preferably between 5° and 90°, and that of the termination of the locking between 0° to 10° after the end of the closing procedure. The position for the introduction of a new pre-form is likewise between 5° and 90°. Depending upon the machine the values can vary very widely.

The locking cam extends in particular over an angle which is larger than the angular range in which the shaping station is opened.

In particular, opening of the blow mould parts takes place over at least 5°. In particular, closing of the blow mould parts also takes place over at least 5°.

In particular, at least one third of the locking cam is situated in a region along the periphery of the carrier in which the blow mould parts are opened, and at least one further third is situated in a region in which the blow mould parts are closed.

The locking cam is to be understood in such a way below that, as well as the locking, it is also responsible for the unlocking of the mould carrier parts.

It is advantageous for the apparatus for the shaping of plastics material containers to be a blow moulding machine, and in a particularly preferred manner a stretch blow moulding machine. This means that the plastics material pre-forms are expanded to form the plastics material containers by being acted upon with compressed air. In the case of a further advantageous embodiment the shaping stations have in each case stretch bars which stretch the plastics material pre-forms in the longitudinal direction thereof, and blow moulding nozzles through which compressed air can be introduced into the pre-forms.

In the case of a further advantageous embodiment the blow mould carrier parts capable of being moved with respect to each other are pivotable side parts. It is advantageous in this case for a pivot axis, with respect to which at least one side part and preferably the two side parts are pivotable, to extend in a vertical, i.e. perpendicular, direction. It would also be possible, however, for the blow mould parts to be designed so as to be capable of being opened in a linear manner. One side part could also be stationary with respect to the blow moulding wheel, and the other could be movable. It would also be possible for three or four blow mould carrier parts to be associated with one shaping station—depending upon how many undercuts are present when removing the containers from the mould. The mould carriers could also open in an angularly asynchronous manner or respectively could also open to a different extent and/or at different end angles. Concerning the ability of containers to be produced with conveying star wheels, this has advantages in many cases.

In the case of a further advantageous embodiment, the shaping stations additionally have base parts which also close a blow mould from below.

In particular, the carrier is designed in the form of a substantially round machine table (blow moulding wheel) and revolves about a perpendicular axis, in which case both blow mould carrier parts of the shaping stations are mounted in a pivotable manner on a perpendicular, and in particular common, axis arranged on the machine table and the movable locking element can likewise be pivoted about a perpendicular axis. In the locked state of the blow mould carrier parts this locking axis is, in particular, situated at a greater distance from the axis of the machine table than the axis or the axes of the two blow mould carrier parts.

The apparatus has, in particular, an opening and closing cam (referred to as the main cam below) which causes the shaping station to open and close. The opening and closing mechanism has a cam follower which co-operates with the main cam during the movement of the carrier. The main cam is, in particular, arranged in a stationary manner as compared with the revolving blow moulding wheel.

It is situated preferably radially inside the reference circle in which the pre-forms or the containers respectively are conveyed, behind the shaping stations as it were.

In particular, the locking mechanism has a cam follower which co-operates with the locking cam during the movement of the carrier. The locking cam is in particular arranged stationary as compared with the revolving blow moulding wheel and the mould carriers. It is preferably situated radially outside the reference circle in which the pre-forms or the containers respectively are conveyed by the shaping station, in front of the shaping stations as it were—as viewed from a position radially outside the machine and from an angle at which the cam is arranged on the machine, for example 0°.

In this way, the shape of the locking cam has on average a larger diameter than that of the main cam.

It is also possible, however, for an arrangement of the cams to be selected in which the average diameter of the locking cam is smaller than that of the main cam. In this way, it would be situated radially inside the main cam.

In particular, in the case of a machine revolving about a perpendicular axis the locking cam is arranged higher than the main cam. Both cams are preferably, however, arranged below the conveying plane of the containers, which is advantageous for the design of the cams on a machine stand of low height. The locking cam is situated, in particular, at a height which corresponds approximately to the height of the lower end of the blow mould carrier parts. Expressed more precisely, it is situated in all events just below a height at which a base of a container to be conveyed away can be situated at the lowest (depending upon the height of the container, the conveying height of the upper container aperture or of a carrying ring respectively is preferably always the same). In this way, finished blow moulded containers can still be conveyed away above it and the distance from the locking means is relatively small in the perpendicular direction (small lever arm, and so less force upon the locking means). The distance of the locking cam from the lowest container to be conveyed away in the region of the conveying away is in the region of from 500 mm to 1 mm, preferably in the region of from 100 mm to 1 mm.

It is also possible, however, for an arrangement of the cams to be selected in which the locking cam is arranged above a conveying plane of the containers.

In particular, the position of the cam follower associated with the locking mechanism is capable of being changed with respect to the carrier by the opening and closing mechanism. This cam follower thus follows the opening movement of the mould carriers.

The locking cam has, in particular, a cam shape which, downstream of an unlocking portion and upstream of a locking portion as viewed in the direction of movement of the carrier, compensates the change in position—dependent upon the opening and/or closing movement of the blow mould carrier parts—of the cam follower associated with the locking mechanism, in such a way that this cam follower constantly rests against the locking cam in this region. This has the advantage that the wear can be considerably reduced, since, in this way, a cam follower designed for example in the form of a roller has to be accelerated only once per revolution.

This step also facilitates inter alia the use of plastics material rollers as cam followers for the actuation of the locking means. As a result of using plastics material rollers it is also possible to dispense with hardening and also lubrication of the locking cam as compared with steel rollers. In particular, the approach segments of the cam can be produced for example from normal steel or high-grade steel. Depending upon the output capacity and loading, however, it is also possible that rollers with a steel cover nevertheless have to be used.

In the case of a further advantageous embodiment the locking means has a force reservoir. It is constantly forced (turned, pressed or pulled) by the latter into the locking position. While passing the locking cam the force reservoir is tensioned in the tensioning direction by way of the cam follower. At the end of the unlocking procedure it is released to the extent that positive locking produced by the locking means is discontinued and the blow mould carrier halves can be opened. The force reservoir is, in particular, a torsion spring, but it can also—depending upon the arrangement—be a compression or tensile spring or a pneumatic spring.

The force reservoir is preferably loaded to a greater degree in the opening position along the, in particular, complete region of the locking cam than in the locking position in the region free from the locking cam. It would also be possible for the reservoir to be subjected to a maximum loading when the positive locking is discontinued and produced again and in between is subjected to only a medium to slight loading, but preferably so much that the cam follower remains resting against the locking cam and/or rolls jointly with it. It is preferable for the locking mechanism to have a first element arranged on the one first blow mould carrier part and a second element arranged on a second other blow mould carrier part, in which case these two elements co-operate with each other in a positively locking manner in order to lock the blow mould carriers. In particular, an element is arranged so as to be movable in relation to the blow mould carrier part associated with this element. A cam follower is arranged, in particular in a indirect manner, on this element. It is also possible for the two elements to be movable, in particular in the opposite direction.

In particular, the movable element is mounted so as to be pivotable about an axis and the cam follower is situated on one side of the axis and a part of the element in positive locking with the locking means is situated on the other side of the axis. The locking elements are preferably hooks which engage in one another. The direct arrangement of the cam follower on the moved element is very cost-saving.

The movable element preferably co-operates by way of the aforesaid force reservoir with the blow mould carrier part associated with this element and is constantly forced into a locking position by the force reservoir.

In particular, the movable element can have arranged on it a manual lever by way of which the force reservoir is capable of being tensioned in such a way that the positive locking of the locking elements can be discontinued manually and the blow mould carrier parts can be opened, for example for changing the blow mould or for assembly purposes. This is usually carried out in a changing mode (without running production of the machine) in which the operator performs the operations in the region free of the guide cam, for example at 90°, 180° or 270°.

In particular, it has to be borne in mind that both the opening and closing cam as well as the locking cam have shapes which extend only in one plane in relation to the movement path of the shaping station, and the two planes associated with the cam shapes are parallel to each other. In this case "in relation to the movement path" means that a possible curvature of the movement path is discounted, in other words: in the case of a curved movement path of the shaping stations the cams are considered to be "rolled up", so that it corresponds to a linear movement. Only the relative movement of the shaping stations with respect to the cam is considered or the cam is considered two-dimensionally respectively as it were.

If the cam shapes in the case of a blow moulding machine rotating about a perpendicular axis extend for example along a reference circle and the actuation of the locking mechanism and the mould carrier opening mechanism is produced by differences in height in the cam shape, then the area spanned by the cam shape would be cylindrical—even if only the relative movement is taken into consideration the cam shapes are situated in a vertical flat plane and are parallel to one another. In an absolute reference system (assembly shop of the machine) the areas of the locking and opening cam would be concentric cylinders in this case.

It is preferable for both the opening and closing cam as well as the locking cam to be arranged or orientated respectively in a horizontal manner in the case of a blow moulding machine rotating about a perpendicular axis. The cam shapes are characterized in this case in that they are at different radial distances from the centre axis of the machine. In other words the cam shape moves away from the centre axis in specific portions along the periphery and approaches different peripheral portions of the centre axis. This is particularly advantageous when the opening movement of the mould carrier takes place in a horizontal plane or by a rotary or pivoting movement respectively about a perpendicular pivot axis—in this way it is possible to dispense with a deflecting gear mechanism for the movement of the mould carrier as compared with the vertical cam.

It is preferable for the main cam and the locking cam to be orientated in such a way that the cam followers of the opening and closing mechanism and the locking mechanism are moved in each case and exclusively in the horizontal direction.

As a result of the fact that both the opening as well as closing cam and the locking cam have shapes which are situated in parallel planes, a better possibility of compensation is provided for the movement of the cam follower of the locking means produced by the two cam shapes. In addition, as a result of this step—considered as being the relative movement—a linear movement of the cam follower can be provided at each position along the cam.

In specific configurations of the machine it is also possible for the planes of the cam shapes to intersect or respectively for the planes to be at a right angle to each other, for example if the plane of the locking means is perpendicular and the plane of the mould carrier actuation means is horizontal. In this case the cam follower would have to carry out a three-dimensional movement—the relative movement already taken into consideration—and would be additionally moved on the locking path in the radial direction with respect to the machine axis. If a roller is used this is in fact disadvantageous with respect to wear. It would be possible, however, for a ball to be used as the cam follower for this purpose. In addition, the cam would have to be made very wide for this case or have, in addition to the vertical course, a radial course which is not constant.

In particular, it has to be borne in mind that the continuous locking cam has at least two segments, i.e. it is constructed in at least two parts, and a segment preferably extends over at least 10° along a peripheral angle. As a result, it is possible—if steel rollers are nevertheless to be used—for an approach segment for example, against which the rollers strike, to be replaced separately.

In particular, the segments also have means for the positioning or respectively setting (for example grooves and/or fitting bores) with respect to one another and/or with respect to a machine stand.

It is preferable, however, for the cam to be made in one piece. In this way, the adjustment outlay can be reduced and a gentle course of the cam followers can be implemented without gaps or projections caused by incorrectly adjusted segments.

In the case of a further advantageous embodiment the apparatus has a clean room inside which the shaping stations are conveyed. In the case of the advantageous embodiment the blow mould carrier parts are arranged inside this clean room in this case.

In addition, on account of its simple design and the therefore easy capability of being cleaned and sterilized, the locking means is also suitable for being used under clean room conditions. To this end, the apparatus can be arranged in a clean room which is kept under a slight over-pressure, so that no germs or other impurities/contamination can penetrate into the machine through the air. In the same way, the apparatus can have an inlet for sterilization agent which also sterilizes inter alia the parts of the locking means.

In the case of a further advantageous embodiment drive devices for the closure, locking and/or opening of the shaping stations are situated outside the clean room. It is advantageous for suitable drives, i.e. in particular guide cams, to be situated below and/or above a clean room boundary.

In the case of an advantageous embodiment the locking device has a pivotable locking element. It is advantageous in this case for this locking element to be arranged in a pivotable manner on one of the two blow mould carrier parts. It is particularly preferred for this locking element to engage in another locking element of another blow mould carrier part.

In the case of a further advantageous embodiment the locking cam extends along a peripheral angle which amounts to at least 50°, preferably amounts at least 60° and in a particularly preferred manner amounts to at least 70°. In order to make available as much process time as possible, the feed star wheel and the delivery star wheel are arranged as close to each other as possible, and so the locking cam extends by less than 180°, preferably by less than 140° and in a particularly preferred manner by less than 110°.

In particular, a sensor, which checks the opening and/or closing state of the mould carrier halves, can be present shortly after the end of the locking cam. In particular, the sensor can be designed in the form of a contact sensor which has a window through which each cam follower of the locking means passes during the rotation of the carrier. If a defective setting occurs, i.e. if the mould carriers are not locked and/or are not properly closed, the cam follower moves towards part of a frame surrounding the window. As a result of the collision with the frame, a signal is forwarded to the control device by way of the sensor. In particular, a stoppage of the production (inter alia an introduction of blow moulding air) can be initiated when a signal of this type is received. In other words the movement of the carrier could then be stopped. The window frame has, in particular, two strips between which the cam followers move. In this case in particular, a strip is arranged in a position which is situated at a distance from a normal position in relation to the blow moulding wheel contrary to a direction of an unlocking movement of the cam follower. The other strip is situated offset in the other direction. It is also possible for only one strip to be present. In particular, the strip or the strips is or are arranged radially inside and/or radially outside the path in which the cam follower is situated in normal operation.

The present invention further relates to a method of shaping plastics material pre-forms into plastics material containers, in which the plastics material pre-forms are conveyed by means of shaping stations along a pre-set conveying path and are shaped to form the plastics material containers during this conveying. In this case the shaping stations have blow mould carrier parts which are movable with respect to each other in order to close the shaping stations. In addition, the (two) blow mould parts are held against each other by means of a locking mechanism at least for a time during the shaping procedure—in particular without the action of a locking cam.

According to the invention, from shortly after a beginning of an opening procedure until shortly before a conclusion of a closure procedure of the blow mould carrier parts a cam follower of the locking mechanism constantly rests against a locking cam associated with it.

The moment in time for the beginning of the opening is that of the start of the removal of the blow mould carrier parts from each other. In this context "shortly after" and "shortly before" should mean approximately 10% of the time or of the path of the mould carrier covered during the entire opening phase during a revolution. This means that while the mould carrier is opened the cam follower is in contact with the locking cam for at least over 80% of the path or the time. In particular, it is also possible for it to be more than 95%, and it is preferably 100%.

BRIEF DESCRIPTION OF THE DRAWINGS

Further advantages and embodiments are evident from the accompanying drawings. In the drawings

DETAILED DESCRIPTION

Figure 1:
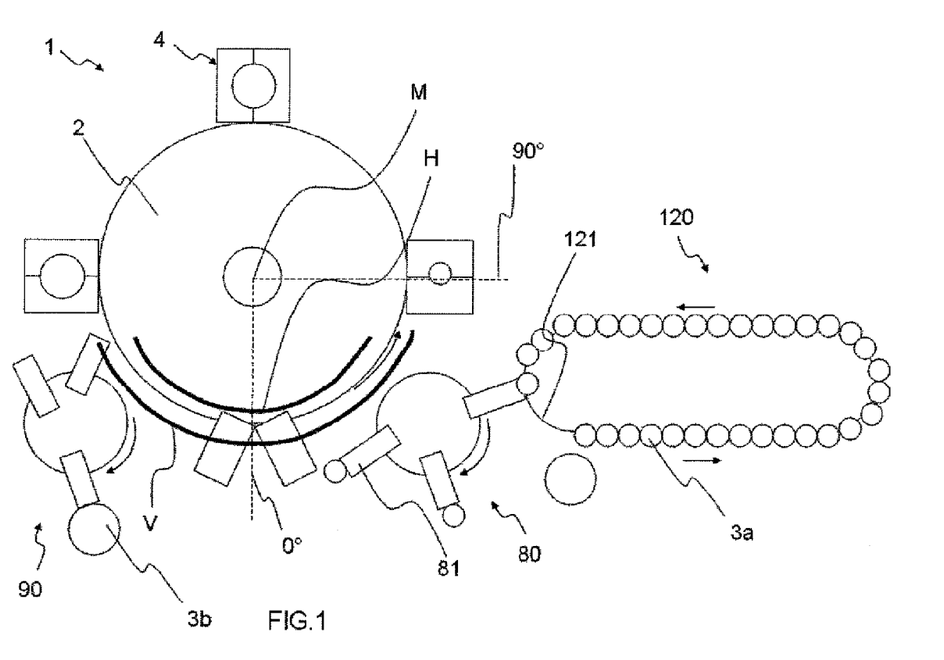
FIG. 1 is a diagrammatic illustration of a plant for the production of containers.

FIG. 1 shows an apparatus 1 according to the invention for the production of plastics material containers 3b. In this case plastics material pre-forms 3a are first conveyed on a conveying chain 121 and are heated by means of a heating device 120. After that, the plastics material pre-forms 3a heated in this way are taken up by a supply star wheel 80 and are transferred to a plurality of shaping stations 4. This supply star wheel 80 has in this case a plurality of arms 81 which are pivotable with respect to this star wheel and on which holding elements, for example clamps, are arranged (not shown) in each case for holding the plastics material pre-forms.

The reference number 2 refers to a rotatable carrier on which are arranged a plurality of shaping stations 4 (only four shown diagrammatically here). These shaping stations 4 have in this case a first blow mould carrier part 6 and a second blow mould carrier part 7. Blow mould parts are arranged on these carrier parts, so that when these blow mould carrier parts 6, 7 are closed the blow mould parts are also closed and thus form in their interior a cavity which is used for the expansion of the plastics material pre-forms 3a. The contour of the containers 3b could also be milled directly into the blow mould carrier parts 6, 7, but this gives rise to difficulties when different types of containers are to be produced with the machine 1. The reference number 90 designates a removal star wheel by which the expanded plastics material containers 3b can be removed. The angle marking 0° is visible between the star wheels 80 and 90. The star wheel axes 80 and 90 are arranged substantially symmetrically to this angle marking, i.e. at an almost equal distance from it. In addition, the star wheels are at substantially the same distance from the axis of rotation M of the machine. The 0° marking passes through the axis of rotation M of the machine. The blow mould carrier parts 6, 7 are also referred to as mould carriers.

The cams H and V are situated in the region of the conveying star wheels 80 and 90 and are arranged on the periphery of the peripheral path of the blow moulding stations 4. In this case it should be noted that the cam V extends continuously between the conveying star wheels.

Inclinations or respectively changes in the curvature of the cams K and V are not taken into consideration here. This should be illustrated in the following figures.

Figure 2:
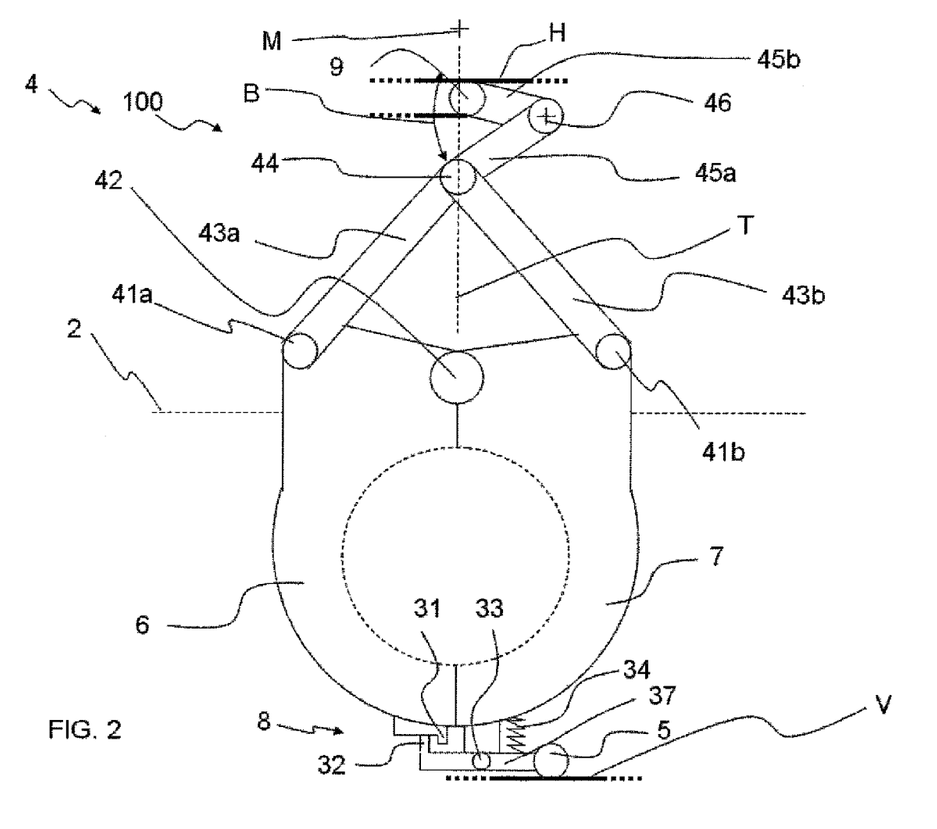
FIG. 2 is a diagrammatic illustration of a shaping station.

FIG. 2 is an illustration of a shaping station 4. This shaping station 4 has in this case a first blow mould carrier part or a first blow mould carrier 6 respectively and a second blow mould carrier part or a second blow mould carrier 7 respectively. The reference number 42 designates a shaft or a pivot bearing respectively which extends at a right angle to the plane of the figure and with respect to which the two mould carriers 6 and 7 are mounted so as to be pivotable. This pivot bearing is advantageously arranged in this case in a stationary manner on the carrier 2 shown above. Holding means 41a, 41b are arranged on the respective mould carrier parts 6 and 7, and articulation means 43a, 43b (articulation levers) indicated by straight lines are in turn arranged on them so as to be pivotable. The reference number 9 designates a cam roller which is used for opening and closing the two mould carrier parts 6 and 7. The references 45a and 45b designate a rod connection by which the cam roller 9 is connected to a pivot bearing 46 which is stationary with respect to the blow moulding wheel 2. The reference number 44 designates a pivot bearing which is movable with respect to the blow moulding wheel and by the movement of which (arrow B) the mould carrier parts 6 and 7 can be opened upwards for example. The elements 9, 45a, 45b are advantageously connected to one another in a fixed manner and are fastened so as to be rotatable about bearings 46.

The reference number 8 designates a locking mechanism or the locking means respectively as a whole. This locking mechanism 8 has in this case a pivotable locking lever 37 which is rotatable with respect to a pivot bearing 33 about an axis which in this case is at a right angle to the plane of the drawing. In this way, the pivot axis is also at a right angle to a conveying path of the shaping stations here. In this way, this locking lever 37 is arranged in a pivotable manner on the second mould carrier part 7. A locking element 32, which is designed in the form of a projection radially inwards in the direction of the axis 42, is arranged on the locking lever 37. The projection 32 is designed in the form of a hook which extends in particular over a substantial part of the height of the mould carrier 7- and likewise the element 31.

A further locking element 31 is arranged on a first mould carrier part 6, which is immovable with respect to the mould carrier 6.

The reference number 34 refers to a compression spring which presses the locking element 32 against the second mould carrier part 7 or presses the locking element 32 in the direction of a locking position in the direction of the element 31 respectively.

The reference number 5 refers to a further cam roller which in this case is used for the movement of the locking element 32, and in particular for the opening of the locking means 8.

For this purpose, a further guide cam is provided, the locking cam V. The latter has only one guide face which, in particular, is directed radially inwards in the direction of the axis M, whereas the main cam H has two guide faces for the cam follower 9 in the form of a groove, since the mould carrier halves have to be moved actively in both directions. In the case of the locking means 8, on the other hand, a tightening is carried out by the spring 34, and because of this a guide cam V on one side is sufficient. The reference letter T designates a separation plane between the mould carrier parts 6 and 7, which in this case is arranged at a right angle to the peripheral path of the shaping station 4 and extends through the axis 43 and M. In particular, however, the separation plane can also be arranged at an angle to the line tangential to the peripheral path, so that the pivot axis 43 is arranged so as to be leading with respect to the locking means 8 with the movement of the blow moulding wheel 2. The pre-forms 3a could thus be introduced into the blow mould more from the rear, and this would have advantages in the kinematics of the conveying star wheels 80 and 90 and in a space-saving arrangement of the stations 4 with respect to one another. The curves H and V and the blow moulding wheel 2 may be seen in the rolled-up view here.

The simplicity of the locking means 8 should also be noted: All the parts of the locking means 8 which are movable relative to the mould carriers 6 and 7 are directly connected to one another. This means that no gear mechanism is interposed in order to move the mechanism. The movable parts are pivotable only by way of a single axis 33.

Figure 3:
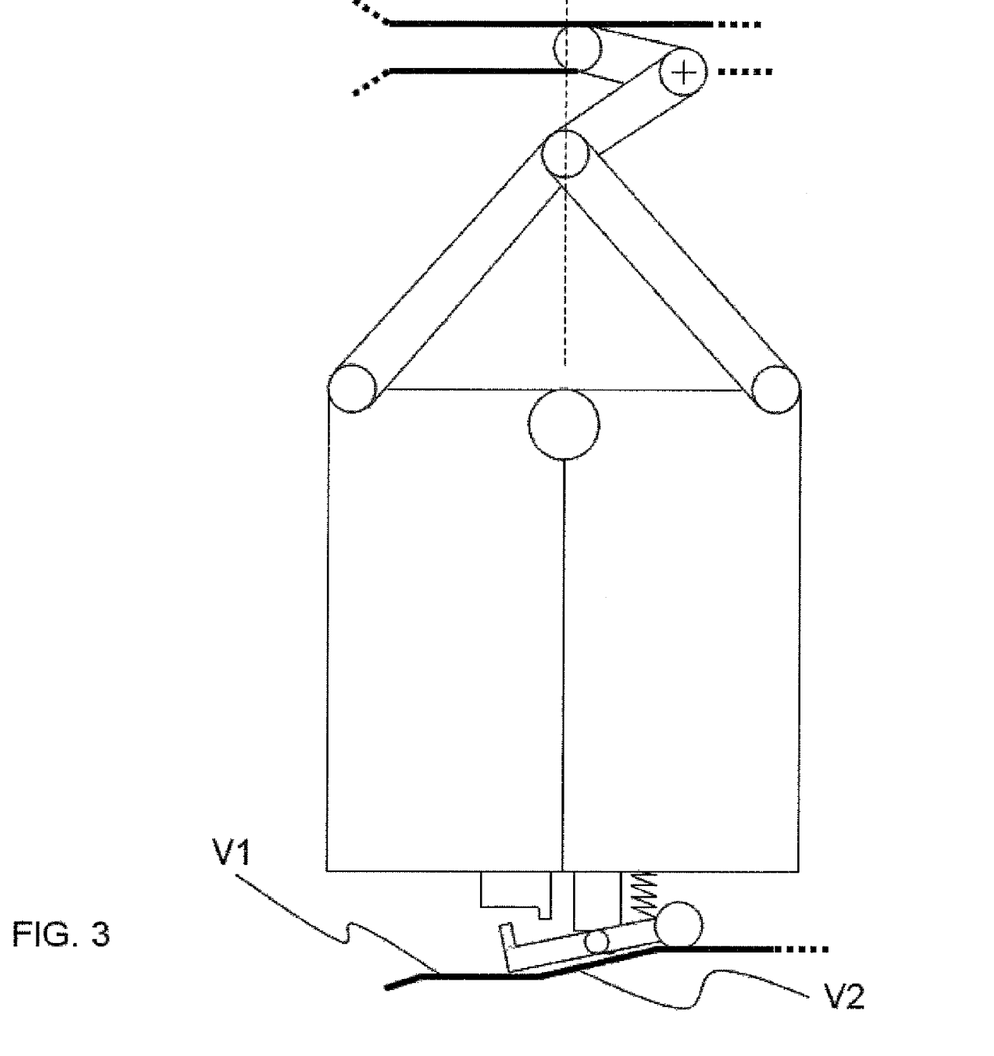
FIG. 3 is a diagrammatic illustration of an unlocking procedure for a shaping station.

FIG. 3 shows the opening procedure for the locking means 8. During the rotation the mould carrier 6, 7 passes the locking cam V which in the portion V2 actuates the cam follower 5 and presses against the force of the spring 34, so that the lever 37 is pivoted about bearings 33 and the projection 32 is lifted off from the element 31 of the other mould carrier. The positive locking between the elements 31 and 32 is thus discontinued and the mould carrier can now be opened. An approach segment V1 may likewise be seen, in which the roller is accelerated. The approach segment also has a catching segment which is not provided with a reference number. Here "segment" does not necessary mean that a plurality of parts are involved.

Figure 4:
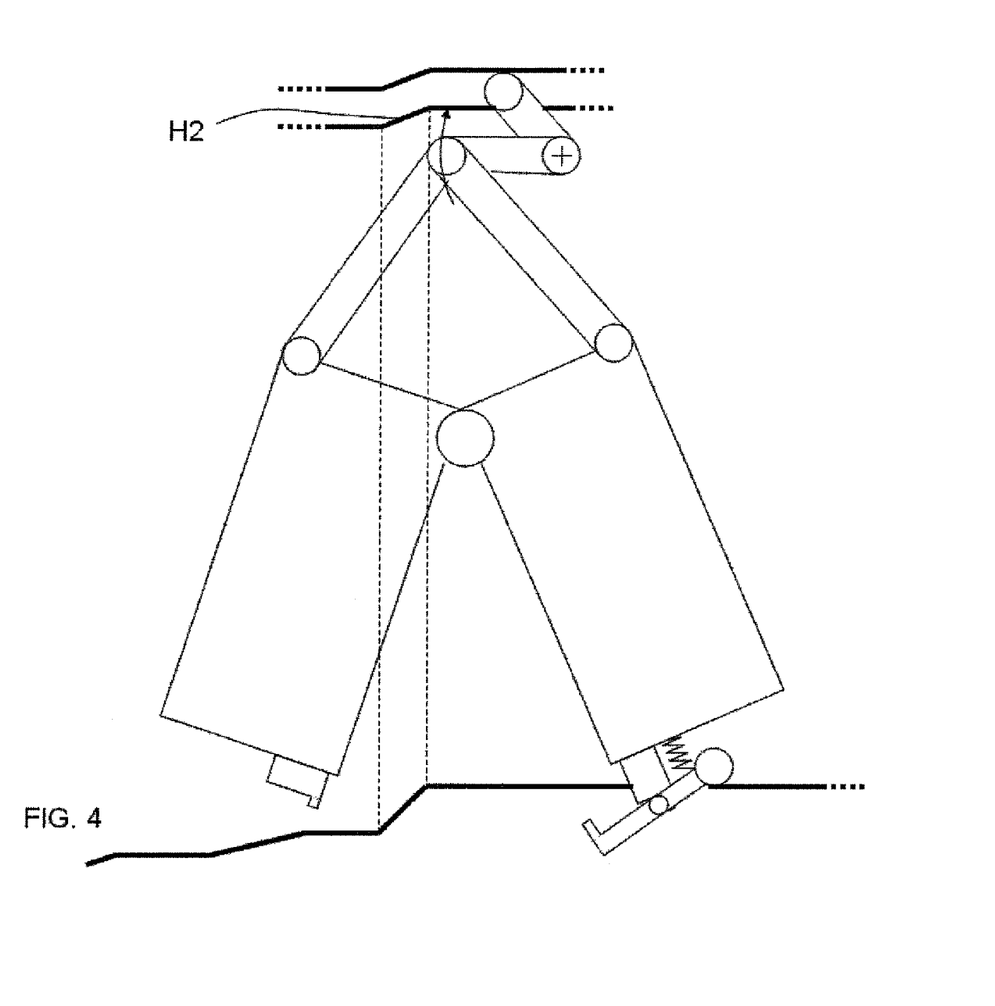
FIG. 4 is a further illustration to demonstrate an opening procedure.

The opening procedure of the mould carrier halves 6 and 7 is illustrated in FIG. 4. In this case the shaping station 4 moves from left to right here (as in FIGS. 2 and 3). After the unlocking the blow moulding station is moved by the carrier 2 past the cam portion H2 which has an inclination and moves the cam roller 9 into a different radial position with respect to the blow moulding wheel 2. In this way, the opening mechanism 100 for the mould carriers is actuated. At the same time and respectively at substantially the same position in the peripheral direction the locking cam likewise has an inclination which has the effect that the cam roller 5 of the locking means remains resting against the cam V. In other words, in order to hold the cam follower 5 of the locking means 8 on the locking cam V, the locking cam V likewise has a change of curvature in the same peripheral position in which the main cam H has change of curvature for opening the mould carriers 6, 7. The same applies to the closure movement, in order to restore the distances between the curves H, V and the cam followers 5, 9 back into the state of FIG. 3 after the closure.

It could also be said that the locking cam V and the main cam H are adapted to each other in such a way that the locking cam V is constantly actuated in the region after the start of opening the mould carriers 6, 7 until the end of the closure.

In particular, in the meantime it is also in the position which discontinues the positive locking. It would also be possible, however, for the locking means 8 to be actuated only slightly in order to keep the load exerted by the spring 34 upon the roller 5 or the cam V low.

Figure 5:
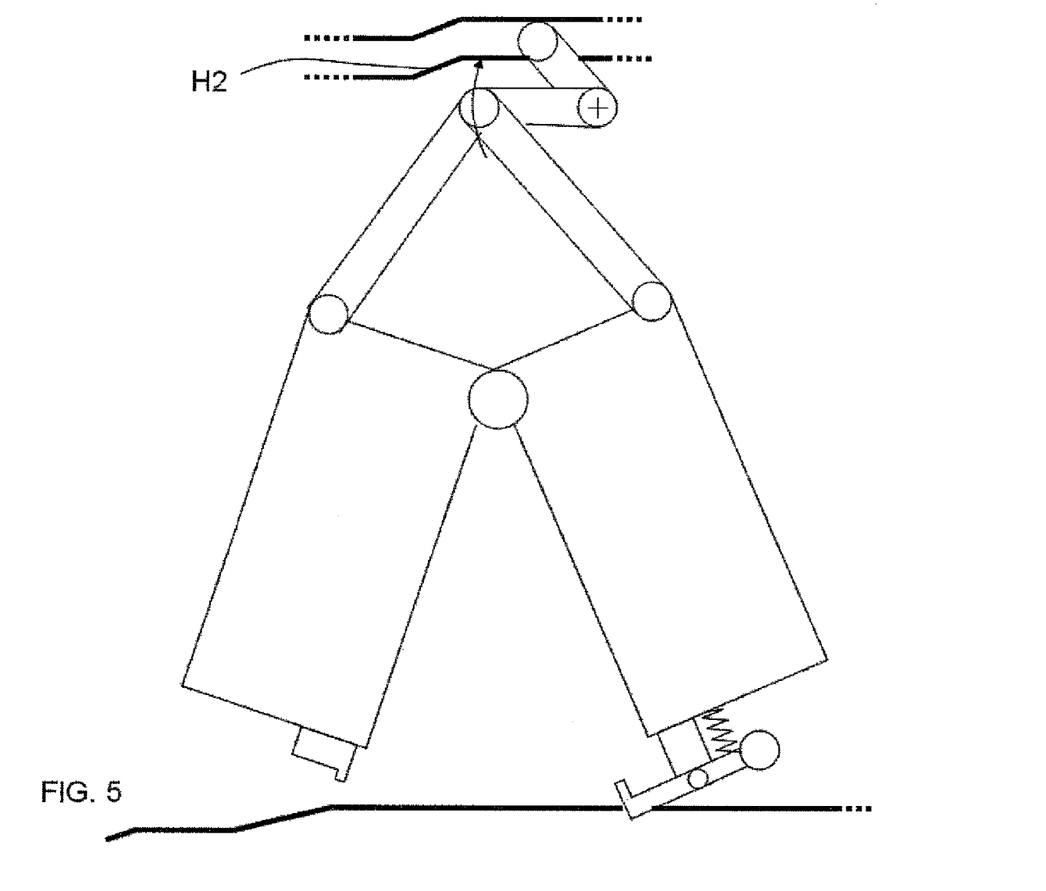
FIG. 5 is an illustration of a shaping station with an alternative locking cam.

The situation in which the locking cam V is not adapted to the main cam is illustrated in FIG. 5. Although this would also work, since the roller 5 would approach the cam again for abutment and for actuation and the locking means 8 would thus open again during the closure movement of the mould carriers, the cam follower 5 would nevertheless have to be accelerated twice per revolution.

Figure 6:
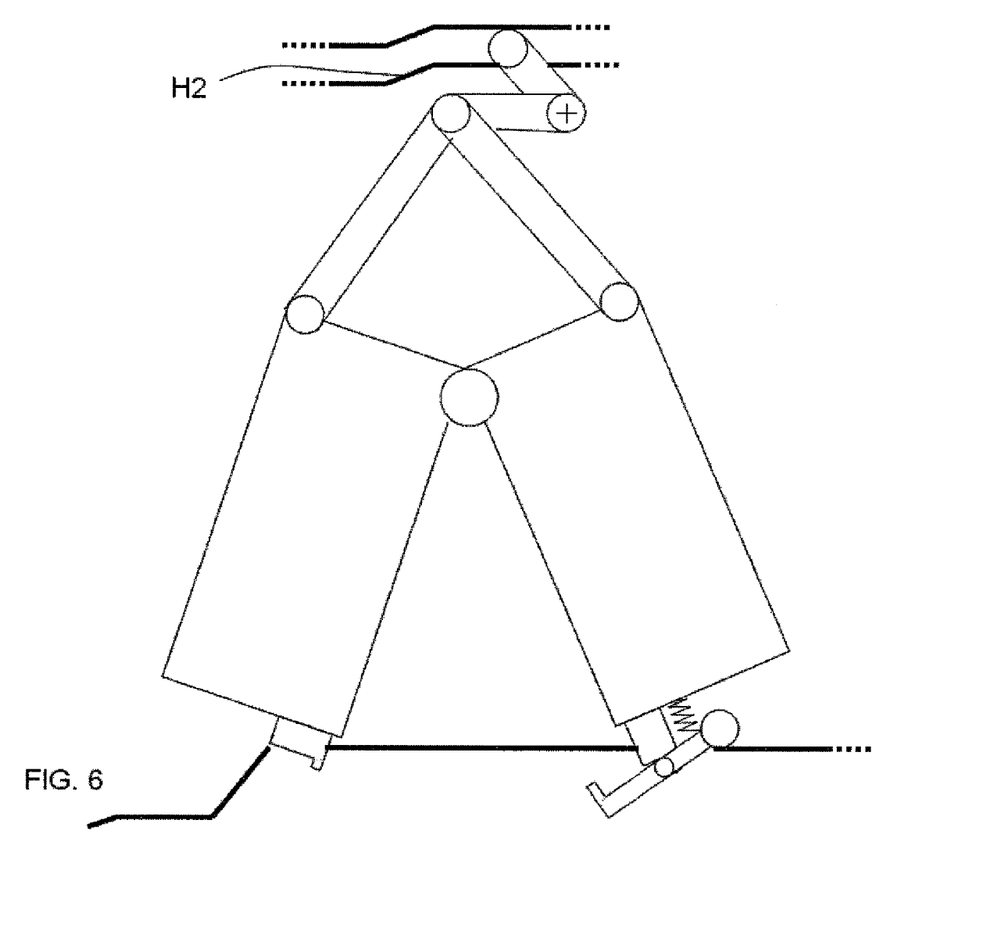
FIG. 6 is an illustration of a shaping station with an alternative locking cam.

Another solution for this would be to make the path covered by the spring 34 or the path covered by the lever 37 respectively sufficiently large for the cam V to press the roller 5 so far into the unlocking position directly during the unlocking that a removal of the roller 5 initiated on account of the opening movement of the mould carrier 6, 7 can be compensated by the cam V. This is illustrated in FIG. 6.

Figure 7:
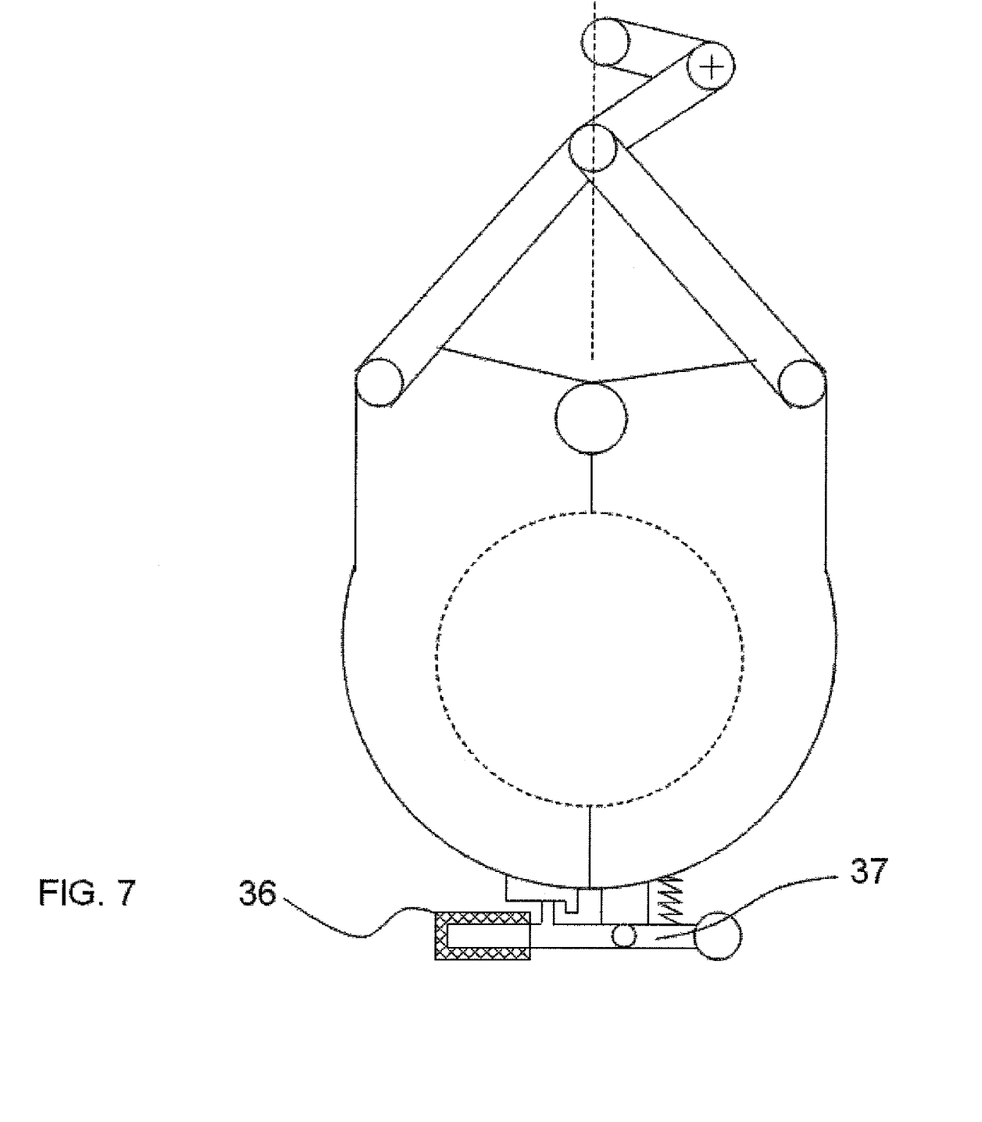
FIG. 7 is a further illustration of a locking mechanism.

FIG. 7 shows a manual lever 36 which is attached to the locking means and by which the locking and unlocking as well as in particular the opening of the mould carrier halves 6, 7 can be carried out. To this end, the lever 36 is attached directly to the lever 37. The operator only has to overcome the force of the spring 34.

Figure 8:
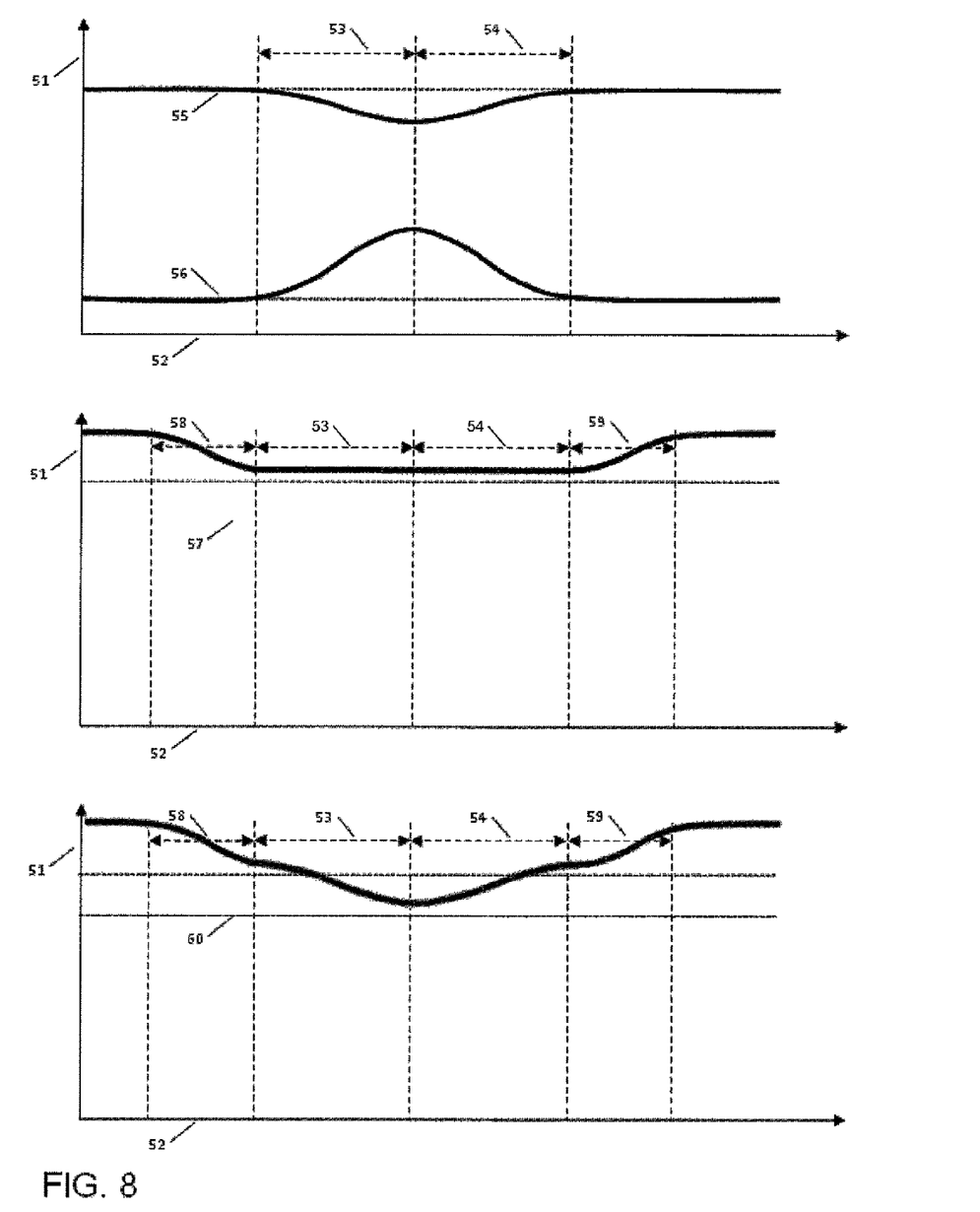
FIG. 8 is an illustration of cam shapes.

FIG. 8 shows the shapes of the locking cam V and the main cam H relative to each other in the case of a blow moulding machine 1 with horizontal cam shapes and a vertical axis of rotation M of the blow moulding wheel 2. In this case the axis 51 constitutes the radial amplitude of the rollers 5, 9 and the axis 52 the peripheral position or the angular course respectively.

Upper Picture:

The curve 55 designates the cam shape of the mould carrier opening, and the curve 56 designates the opening angle of the mould carriers. The opening of the mould carriers is evident in region 53 and the closing of the mould carriers is evident in region 54. The maximum opening position is achieved in this case only in a very small region, in particular only at one point. During approximately the entire opening and closing process the mould carrier parts 6, 7 are moved relative to the blow moulding wheel 2. In particular, the cam shape is steady.

Middle Picture:

The curve 57 designates the radial amplitude of the cam roller 5 in relation to the mould carrier half 7, to which it is fastened. The unlocking takes place in the region 58, and the locking takes place in the region 59. It will be seen that the regions of the mould carrier opening and closure (53, 54) adjoin the regions of the locking and unlocking (58, 59) almost or even completely seamlessly. In this case it is evident from the straight portion of the cam shape in the region 53 and 54 that the locking cam V is designed in such a way that it compensates a radial distancing caused by the movement of the mould carrier 7 and an approaching. The unlocking advantageously starts before the beginning of the opening. The locking can already start before a final closure, but it ends in particular only during or after a conclusion of the closure procedure.

Lower Picture:

In contrast thereto the amplitude of the roller 5 is plotted in relation to the blow moulding wheel 2 in the lower picture. This corresponds therefore to the shape of the locking cam V (rolled up). In this case it will be seen that the locking cam has two changes in curvature in the region of the beginning of opening of the mould carrier (end region 58, beginning region 53) for the reasons mentioned in conjunction with the middle picture. Likewise in the region from the end of the closure until the start of the locking.

It would also be possible for the mould carrier halves to have a constant opening angle over a region of the path after the opening and only then to be closed again. This region can extend over at least 5°.

FIG. 8 essentially corresponds as a whole to the embodiment according to FIGS. 3 and 4.

The Applicants reserve the right to claim the features disclosed in the application documents as being essential to the invention, insofar as they are novel either individually or in combination with respect to the prior art.

The invention claimed is:

1. An apparatus for the shaping of plastics material containers, comprising: a rotating carrier on which are arranged a plurality of shaping stations for the shaping of plastics material pre-forms into plastics material containers, wherein these shaping stations have blow mould carrier parts movable with respect to each other for opening and closing the shaping stations, and wherein the shaping stations have a locking mechanism for holding the shaping stations in a closed state, and an opening and closing mechanism for opening and closing the shaping stations, wherein the locking mechanism has a locking cam opposite which the shaping stations move at least in part, and the locking cam extends, as viewed in the direction of movement of the carrier, continuously between a position in which the blow mould carrier parts are opened and a position in which the blow mould carrier parts are closed; and the blow mould carrier parts are held automatically in the closed state at least along a further partial section of the periphery by the locking mechanism.

2. The apparatus according to claim 1, wherein the region of the partial section is made free of the locking cam.

3. The apparatus according to claim 1, wherein the apparatus has an opening and closing cam, which causes the shaping station to open and close, and the opening and closing mechanism has a cam follower which co-operates with the opening and closing cam during the movement of the carrier.

4. The apparatus according to claim 1, wherein the locking mechanism has a cam follower which co-operates with the locking cam during the movement of the carrier.

5. The apparatus according to claim 1, wherein the position of the cam follower associated with the locking mechanism is changeable relative to the carrier by the opening and closing mechanism, and the locking cam has a shape which, downstream of an unlocking portion and upstream of a locking portion as viewed in the direction of movement of the carrier, compensates the change in position—dependent upon the opening and/or closing movement of the blow mould carrier parts—of the cam follower associated with the locking mechanism, in such a way that said cam follower constantly rests against the locking cam in said region.

6. The apparatus according to claim 3, wherein both the opening and closing cam, as well as the locking cam, have shapes which extend only in one plane in relation to the movement path of the shaping station, and the two planes associated with the cam shapes are parallel to each other.

7. The apparatus according to claim 3, wherein the opening and closing cam and the locking cam are orientated in such a way that the cam followers of the opening and closing mechanism and the locking mechanism are moved in each case and exclusively in the horizontal direction.

8. The apparatus according to claim 1, wherein the locking cam has at least two segments, i.e. it is constructed in at least two parts, and a segment preferably extends over at least 10° along a peripheral angle.

9. The apparatus according to claim 1, wherein the locking cam is made in one piece.

10. The apparatus according to claim 1, wherein the cam follower of the locking mechanism consists of a plastics material, and the locking cam is made non-hardened.

11. The apparatus according to claim 1, wherein the locking means has a force reservoir and it is constantly forced by the force reservoir into a locking position, and the force reservoir is forced in a tensioning direction by the locking cam in the unlocking region.

12. The apparatus according to claim 1, wherein the locking mechanism has an element arranged on one blow mould carrier part and an element arranged on the other blow mould carrier part, and the two elements co-operate with each other in a positively locking manner for locking the blow mould carriers, and wherein an element is arranged to be movable in relation to the blow mould carrier part associated with said element, and a cam follower is arranged on said element.

13. The apparatus according to claim 12, wherein the movable element is mounted so as to be pivotable about an axis and the cam follower is situated on one side of the axis and the part of the element in positive locking with the locking means is situated on the other side of the axis.

14. The apparatus according to claim 12, wherein the movable element has arranged on it a manual lever by way of which the force reservoir is tensionable in such a way that the positive locking of the locking elements can be discontinued manually and the blow mould carrier parts can be opened.

15. The apparatus according to claim 1, wherein the carrier is designed in the form of a substantially round machine table and revolves about a perpendicular axis, wherein the two blow mould carrier parts of the shaping stations are mounted in a pivotable manner on a perpendicular, and in particular common, axis arranged on the machine table and the movable locking element is likewise arranged so as to be pivotable about a perpendicular axis, and in the locked state of the blow mould carrier parts the locking axis is situated at a greater distance from the axis of the machine table than the axis or the axes of both blow mould carrier parts.

16. A method of shaping plastics material pre-forms into plastics material containers, comprising: conveying the plastics material pre-forms by means of shaping stations along a pre-set conveying path; shaping the pre-forms to form the plastics material containers during this conveying; wherein the shaping stations have blow mould carrier parts which are moveable with respect to each other by an opening and closing mechanism for closing the shaping stations; wherein the blow mould carrier parts are automatically held against each other by a locking mechanism at least for a time during the shaping procedure; and wherein from shortly after a beginning of an opening procedure until shortly before a conclusion of a closure procedure of the blow mould carrier parts, a cam follower of the locking mechanism constantly rests against an associated locking cam, wherein the locking cam extends continuously between a position in which the blow mould carrier parts are opened and a position in which the blow mould carrier parts are closed.

17. The apparatus according to claim 1, wherein at least one third of the locking cam is situated in a region along the periphery of the carrier in which the blow mould parts are opened.

18. The apparatus according to claim 1, wherein at least one third of the locking cam is situated in a region along the periphery of the carrier in which the blow mould parts are closed.

19. The apparatus according to claim 1, wherein the locking cam extends along a peripheral angle which is at least 50°.

20. The apparatus according to claim 1, wherein the locking cam extends along a peripheral angle which is less than 110°.

21. The apparatus according to claim 1, wherein the locking cam is situated outside of a reference circle in which one of the performs or the containers respectively are conveyed by the shaping station.

22. The apparatus according to claim 1, wherein the locking cam extends over an angle which is larger than an angular range in which the shaping station is opened.

23. The apparatus according to claim 1, wherein the locking cam is arranged in a horizontal manner.

\* \* \* \* \*